United States Patent
Bansal et al.

(10) Patent No.: US 11,470,119 B2
(45) Date of Patent: Oct. 11, 2022

(54) NATIVE TAG-BASED CONFIGURATION FOR WORKLOADS IN A VIRTUAL COMPUTING ENVIRONMENT

(71) Applicant: Nicira, Inc., Palo Alto, CA (US)

(72) Inventors: Kaushal Bansal, Sunnyvale, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 180 days.

(21) Appl. No.: 15/384,129

(22) Filed: Dec. 19, 2016

(65) Prior Publication Data

US 2018/0176255 A1 Jun. 21, 2018

(51) Int. Cl.
| | |
|---|---|
| *H04L 29/06* | (2006.01) |
| *H04L 9/40* | (2022.01) |
| *G06F 9/455* | (2018.01) |
| *H04L 41/0893* | (2022.01) |
| *H04L 41/0806* | (2022.01) |

(52) U.S. Cl.
CPC .......... *H04L 63/20* (2013.01); *G06F 9/45558* (2013.01); *H04L 41/0806* (2013.01); *H04L 41/0893* (2013.01); *G06F 2009/45587* (2013.01); *G06F 2009/45595* (2013.01); *H04L 63/0218* (2013.01)

(58) Field of Classification Search
CPC ..... H04L 63/20; H04L 43/0876; H04L 41/12; H04L 41/0893; H04L 63/0218; G06F 9/455; G06F 9/45558; G06F 2009/4557; G06F 2009/45595

USPC .......................................................... 726/1
See application file for complete search history.

(56) References Cited

U.S. PATENT DOCUMENTS

| | | | |
|---|---|---|---|
| 2015/0163158 A1* | 6/2015 | Ryland | H04L 47/70 709/225 |
| 2016/0226913 A1* | 8/2016 | Sood | H04L 63/20 |

* cited by examiner

*Primary Examiner* — Jeffrey C Pwu
*Assistant Examiner* — Nega Woldemariam
(74) *Attorney, Agent, or Firm* — Patterson & Sheridan, LLP

(57) ABSTRACT

A method of configuring networking, security, and operational parameters of workloads deployed in a virtualized computing environment includes the steps of: storing multiple policies, each defining one of networking, security, or operational parameters, and associating tags to each of the multiple policies, independent of deployment of a virtual computing instance in the virtual computing environment; responsive to a request to perform configuration of a virtual computing instance being deployed, retrieving policies among the stored multiple policies that are associated with same tags as tags contained in the request; generating configuration parameters for data path components in a host machine of the virtual computing instance and for data path components of the virtual computing instance based on the retrieved policies; and transmitting the generated configuration parameters to the host machine for the host machine to configure the networking, security, or operational parameters the virtual computing instance therewith.

7 Claims, 4 Drawing Sheets

| INDEX | SOURCE | DESTINATION | SERVICE | ACTION |
|---|---|---|---|---|
| 0 | ANY | WEB | HTTP | ALLOW |
| 1 | WEB | APPLICATION | WEBLOGIC | ALLOW |
| 2 | APPLICATION | DATABASE | ORACLE TNS | ALLOW |
| 3 | ANY | ANY | ANY | DENY |
| ... | ... | ... | ... | ... |

FIGURE 2

| INDEX | Collector IP address | probability | idleTimeout | maxFlows |
|---|---|---|---|---|
| 10 | 196.42.101.11 | 1 | 30 sec. | 2 |
| 11 | ... | ... | ... | ... |
| 12 | ... | ... | ... | ... |
| 13 | ... | ... | ... | ... |
| ... | ... | ... | ... | ... |

FIGURE 3

STEP 410: create policies

STEP 420: create operational tags

| TAG |
|---|
| InternetTraffic |
| DBTraffic |
| ... |
| stdIPFIX |
| ... |

STEP 430: attach operational tags to policies

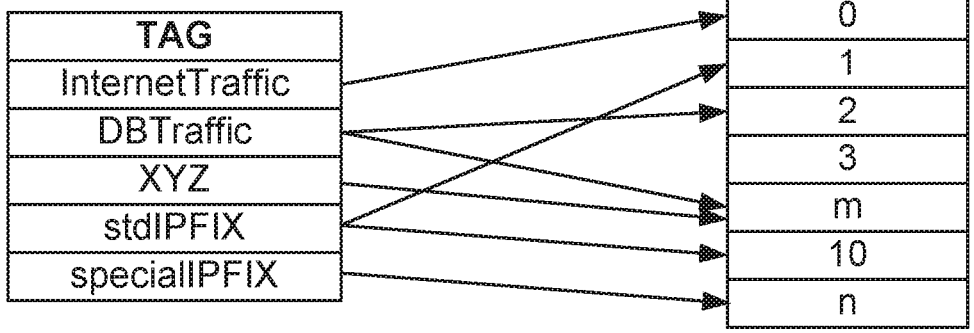

| TAG |
|---|
| InternetTraffic |
| DBTraffic |
| XYZ |
| stdIPFIX |
| specialIPFIX |

| INDEX |
|---|
| 0 |
| 1 |
| 2 |
| 3 |
| m |
| 10 |
| n |

STEP 440: attach operational tags to VM templates

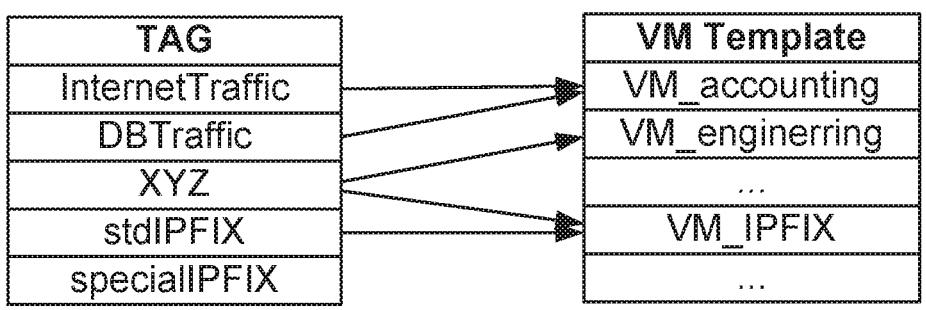

| TAG |
|---|
| InternetTraffic |
| DBTraffic |
| XYZ |
| stdIPFIX |
| specialIPFIX |

| VM Template |
|---|
| VM_accounting |
| VM_enginerring |
| ... |
| VM_IPFIX |
| ... |

FIGURE 4

NATIVE TAG-BASED CONFIGURATION FOR WORKLOADS IN A VIRTUAL COMPUTING ENVIRONMENT

BACKGROUND

In data centers in which virtual machines (VMs) are deployed, each deployed VM is configured with networking configurations, security configurations, and operational configurations. The networking configurations define, for example, how different types of network traffic to and from a VM are distributed within a data center and between the VM and external sources, as well as the network connections (e.g., ports) of the VM in the data center. The networking configurations also define how certain types of traffic terminate at physical infrastructure components (e.g., physical switches or routers) for transmission outside of the data center.

Security configurations define security policies to be enforced within the data center to secure VMs in the data center. For example, the security configurations may define security policies for intra-application communications, blocking policies to protect against incoming threats from external sources, and/or the positioning of a VM inside or outside of a demilitarized zone (DMZ), in which the VM has limited access to internal network resources so that compromising a VM inside a DMZ does not, in turn, compromise VMs and data stored outside of the DMZ.

Operational configurations are applied to a VM after the networking and security configurations have been applied to the VM. The operational configurations may specify, for example, timeout parameters, system logging configurations, how information about traffic and network activity is routed through different infrastructure components (e.g., IPFIX configuration), and so on. "IPFIX" refers to the Internet Protocol Flow Information Export protocol defined by the Internet Engineering Task Force. It is a standard protocol for exporting Internet Protocol flow information from routers and other devices.

Various techniques are currently used to configure networking, security, and operational configurations of VMs in data centers. A simple configuration technique is single policy configuration, where a single global policy is defined for each of the different networking, security, and operational aspects of the VM. While applying a single global policy allows for simple networking, security, and operational configuration of VMs in the data center, it is not practical because customization of the policies is often needed.

An endpoint-based policy configuration provides a certain level of customization. In this approach, multiple policies are defined for each kind of networking and security enforcement point. For example, IPFIX can have a different policy each for a logical switch port, a logical router port, and distributed firewall flows. Further customizations, however, may be necessary in cases where users might require different configurations even within a single enforcement point for different kind of workflows. For example, users might want to have different IPFIX policies for web traffic and for storage traffic.

Another approach for policy configuration is workload-based, where networking, security, and operational configurations are customized for each kind of VM and workload executed in the cloud-based data center. This approach provides much more flexibility in customizing networking, security, and operational configurations of VMs and other workloads as compared to the other approaches discussed above, but it suffers from scalability issues.

SUMMARY

One or more embodiments of a virtual computing environment provide a method of configuring networking, security, and operational parameters of workloads, e.g., virtual computing instances, deployed in a virtualized computing environment. The method includes the steps of: storing multiple policies for operational parameters and associating tags to each of the multiple policies, independent of deployment of a virtual computing instance in the virtual computing environment; responsive to a request to perform configuration of a virtual computing instance being deployed, retrieving policies among the stored multiple policies that are associated with the same tags as tags contained in the request; generating configuration parameters for data path components in a host machine of the virtual computing instance and for data path components of the virtual computing instance based on the retrieved policies; and transmitting the generated configuration parameters to the host machine for the host machine to configure the virtual computing instance therewith.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIG. 2 illustrates one example of a policy table containing different policies for a distributed firewall that can be applied flexibly to workloads in accordance with embodiments.

FIG. 3 illustrates one example of a policy table containing different policies for network flow monitoring that can be applied flexibly to workloads in accordance with embodiments.

FIG. 4 is a conceptual flow illustrating how tags are applied to policies and to workloads in accordance with embodiments.

DETAILED DESCRIPTION

Figure 1:
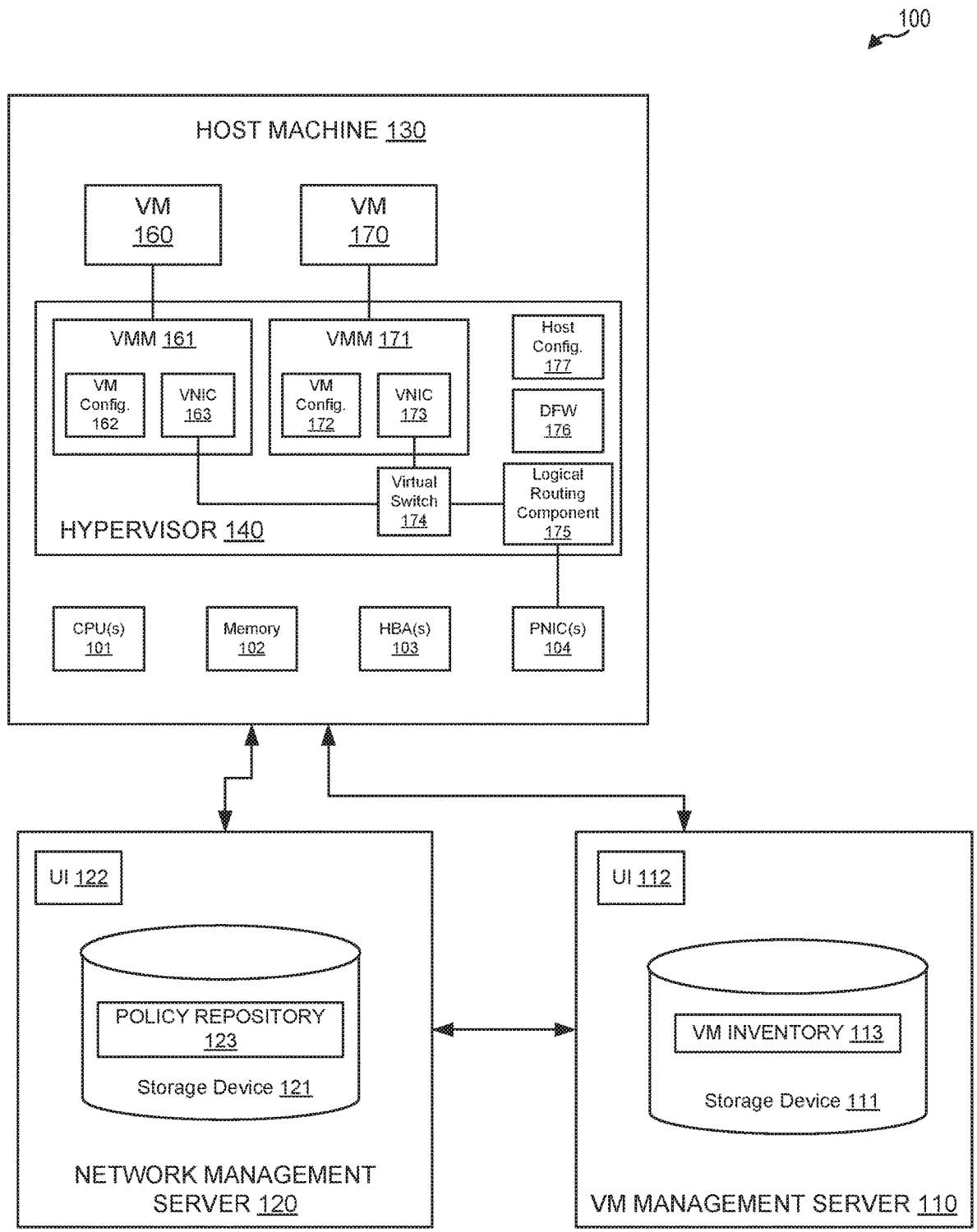
FIG. 1 is a block diagram of a virtualized computing environment in which embodiments may be practiced.

FIG. 1 is a block diagram of a virtualized computing environment 100, in which embodiments may be practiced. As illustrated, computing environment 100 includes a virtual machine (VM) management server 110, a network management server 120, and a host machine 130 in which VMs (or more generally, virtual computing instances) 160, 170 are executed. In FIG. 1, only one host machine 130 is illustrated to simplify the description. Typical virtualized computing environments include a large number of host machines. Host machine 130 has a hardware platform that includes one or more central processing units (CPUs) 101, system memory 102 (typically volatile dynamic random access memory), one or more host bus adapters (HBAs) 103, and one or more physical network interface controllers (PNICs) 104. In addition, a hypervisor 140 is installed in host machine 130 as virtualization software to support the execution of VMs, e.g., VMs 160, 170.

Hypervisor 140 implements a virtual machine monitor (VMM) for each VM to provide a virtual hardware platform for the VM. In the example of FIG. 1, VMM 161 provides a virtual hardware platform for VM 160 and VMM 171 provides a virtual hardware platform for VM 170. The virtual hardware platform provisioned in VMM 161 includes a virtual network interface controller (VNIC) 163 and the virtual hardware platform provisioned in VMM 171 includes a VNIC 173. Configuration parameters 162 for VNIC 163 and other components of VM 160 are stored in a VM configuration file for VM 160 that is accessible to hypervisor 140. Likewise, configuration parameters 172 for VNIC 173 and other components of VM 170 are stored in a VM configuration file for VM 170 that is accessible to hypervisor 140. Hypervisor 140 also implements a virtual switch 174 and a logical routing component 175. Virtual switch 174 enable the VMs supported by hypervisor 140 to communicate with each other and physical NIC 104. Virtual switch 174 may be a managed forwarding element that resides at the edge of the physical network. If VM 160 and VM 170 reside on a logical overlay network, e.g., implemented with VXLAN or other tunneling protocol, then virtual switch includes forwarding tables populated with instructions from network management server 120, which may be also referred to as a software defined networking (SDN) manager and/or controller. Each host 130 having VMs residing on a particular logical overlay network have forwarding instructions that collectively implement a logical layer-2 switch and network. Logical routing component 175 comprises additional forwarding tables and configurations for layer-3 processing. The additional forwarding tables may also be populated by network management server 120.

VM management server 110 provides a user interface 112 for a VM administrator, which may be a person or orchestration software, to manage deployment of VMs. Management information for the deployed VMs is maintained in VM inventory 113, which is stored persistently in a storage device 111. When a VM is requested for deployment, the VM administrator selects a host in which the VM is to be instantiated, applies tags to define networking, security, and operational configurations of the VM, and selects a logical port on logical switch 174 to which the VM is to be connected. In response, VM management server 110 creates a record of the VM in VM inventory 113, and transmits a command to network management server 120 to prepare data path components of the deployed VM.

Network management server 120, as illustrated, includes a user interface 122 and a storage device 121. User interface 122 may be a graphical user interface, command line interface, or application programming interface, or the like. A policy repository 123 in which different policies for networking, security, and operational aspects of the VMs, as created by a network administrator and a security administrator, are stored persistently in storage device 121. Upon receipt of the command from VM management server 110 to prepare data path components of a deployed VM, network management server 120 determines the networking, security, and operational configuration parameters for the deployed VM (using a method which will be further described below), and transmits the VM-specific configuration parameters applicable to the data path components of the VM, and the host-specific configuration parameters applicable to the data path components of host machine 130 to hypervisor 140. Upon receipt of the parameters, hypervisor 140 stores the VM-specific configuration parameters in the VM configuration file for the VM, and the host-specific configuration parameters 177 in host configuration file accessible to hypervisor 140.

FIG. 2 illustrates one example of a policy table containing different policies for a distributed firewall that can be applied flexibly to workloads (e.g., VMs) in accordance with various embodiments of a computing environment. Each policy entry in the table has a unique index number and a number of different attributes that define the policy to be enforced.

FIG. 3 illustrates one example of a policy table containing different policies for network flow monitoring such as IPFIX that can be applied flexibly to workloads in accordance with embodiments. Each policy entry in the table has a unique index number and a number of different attributes that specify the IPFIX configuration parameters that are to be applied.

In addition to policies for distributed firewall and IPFIX, policies for other operational aspects of the VM or other workloads may be defined, e.g., load balancing configurations, network address translation configuration, and so on. In further embodiments, policies may be defined for security and networking configurations for the VM or other workloads. Examples of security configurations include firewalling rules, rules for filtering or blocking different types of traffic, and so on. Networking configurations define traffic flows through different data path components of the VMs and the host machines within the virtual computing environment and outside the virtual computing environment.

FIG. 4 is a conceptual flow illustrating how tags are applied to policies and to workloads in accordance with certain embodiments. The first step is step 410 at which policies are created with unique ID numbers (e.g., index numbers in FIGS. 2 and 3) and stored persistently in policy repository 123. FIG. 2 and FIG. 3 provide examples of policies that are created at step 410. In one embodiment, the security administrator creates the policies for the distributed firewall using user interface 121 of network management server 120, and the network administrator creates the policies for IPFIX using user interface 121 of network management server 120.

After creation of the policies, the administrator (security or network administrator) creates tags and stores information about the tags in storage device 121 (step 420) and attaches the tags to the policies at step 430. As illustrated, the InternetTraffic tag is attached to a policy having index 0, the DBTraffic tag is attached to policies having index 2 and m, the XYZ tag is attached to a policy having index m, the stdIPFIX tag is attached to a policy having index 10, the specialIPFIX tag is attached to a policy having index n. In addition, network management server 120, upon creation of the tags at step 420, communicates information about the tags to VM management server 110, which stores the information about the tags in storage device 111.

In one embodiment, a different administrator, e.g., the VM administrator, carries out step 440. In the example illustrated, the VM administrator attaches tags to VM templates. It should be recognized that, in one embodiment, the tags may be associated with live VMs and updated in real time. Therefore, a VM administrator may attach tags to the VM templates without concern as to what actual policies are associated with the tags. Furthermore, if the security or network administrator modifies a policy to which a tag is attached, any VMs deployed using a VM template to which the same tag is attached will be configured with the modified policy. Thus, according to certain embodiments, defining policies for networking, security, and operational aspects of VMs or other workloads can be performed independent of VM or other workload deployment.

Figure 5:
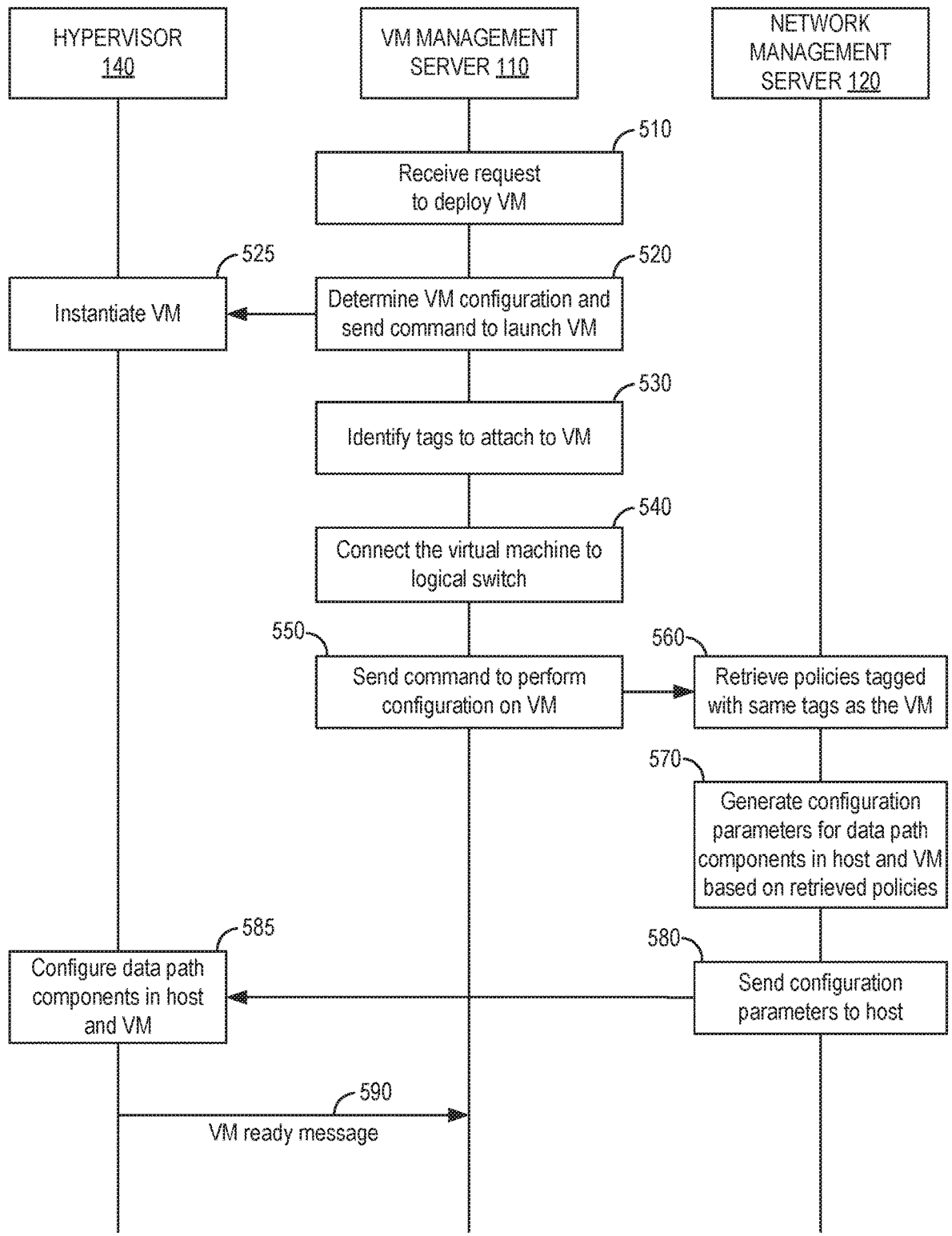
FIG. 5 is a flow diagram illustrating steps carried out by different control planes of the virtualized computing environment during a deployment of a virtual machine, in accordance with embodiments.

FIG. 5 is a flow diagram illustrating steps carried out by different control planes of the virtualized computing environment during a deployment of a virtual machine, in accordance with various embodiments. As illustrated, the control planes include VM management server 110, network management server 120, and hypervisor 140.

The flow illustrated in FIG. 5 is triggered by a request from a user or other entity to deploy a VM, which is received by VM management server 110 at step 510. Responsive to the request, VM management server 110 at step 520 determines the VM configuration based on the request. For example, if the request is from the accounting department to deploy an accountant's virtual desktop or server VM, the VM template for the accounting department is used to determine the VM configuration. Based on the VM configuration, VM management server 110 selects the appropriate host machine for hosting the VM. After selecting the host machine, VM management server 110 sends a command to the selected host machine, in particular the hypervisor (e.g., hypervisor 140), to launch the VM in the host machine.

Responsive to the command from VM management server 110, hypervisor 140 at step 525 instantiates VM, VNIC, and other data path components for execution in the host machine. In parallel, VM management server 110 identifies tags to attach to the VM to define the networking, security, and operational configuration of the VM. If the VM is not deployed from a VM template, tags selected by the VM administrator through user interface 112 will be identified as the tags for defining the networking, security, and operational configuration of the VM. If the VM is deployed from a VM template, the tags attached to the VM template will be identified as the tags along with any additional tags selected by the VM administrator through user interface 112. If there is any conflict between tags applied to the VM template and additional tags selected by the VM administrator, the additional tags will override the tags applied to the VM template.

At step 540, VM management server 110 connects the VNIC of the VM to a port of logical switch 174. If there are more than one VNIC, the VM will be connected to different ports of logical switch 174. In such cases, the networking, security, and operational configuration of the VM will be performed on a per endpoint (per VNIC) basis. To simplify the description, however, it is assumed herein that the VM is the single endpoint being configured.

At step 550, VM management server 110 sends a command to network management server 120 to perform the networking, security, and operational configuration for the VM. The command includes the tags identified at step 530 and an identification of the logical port to which the VNIC of the VM is connected, so that network management server 120 will be able to correctly identify the data path components of the host machine that need to be configured.

Responsive to the command from VM management server 110 to perform the networking, security, and operational configuration for the VM, network management server 120 at step 560 retrieves the policies that have been tagged with the same tags contained in the command from VM management server 110. Then, at step 570, network management server 120 generates configuration parameters for data path components in the host machine that are managed by 140 and the VM based on the retrieved policies and the identification of the logical port to which the VNIC of the VM is connected. At step 580, network management server 120 sends two sets of configuration parameters to the host machine. The first set contains host-specific configuration parameters for configuring data components of the host machine (e.g., logical switch 174, logical router 175, and distributed firewall 176 shown in FIG. 1) and the second set contains VM-specific configuration parameters for configuring data components of the VM (e.g., VNIC 163 shown in FIG. 1).

At step 585, responsive to the command from network management server 120, hypervisor 140 updates the host-specific configuration file (e.g., host configuration file 177 shown in FIG. 1) to configure the data components of the host machine and the VM-specific configuration file (e.g., VM configuration file 162 or 172 shown in FIG. 1) associated with the VM instantiated at step 525 to configure the data components of the VM.

After hypervisor 140 completes updating the host-specific and VM-specific configuration files, hypervisor 140 transmits a VM ready message 590 to VM management server 110. Upon receiving VM ready message 590, VM management server 110 indicates to the VM administrator that the instantiated VM is ready for use.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of configuring a virtual computing instance for execution in a virtual computing environment, comprising:
    storing multiple policies, each defining one or more security or operational parameters for virtual computing instances, the security or operational parameters comprising one or more of:
        load balancing configuration parameters; or
        network address translation configuration parameters;
    associating tags to one or more of the multiple policies such that the tags, when applied to a virtual computing instance, identify a set of the policies to apply to the virtual computing instance;
    receiving a request to configure a virtual computing instance being deployed, the request including information identifying a template, the template specifying one or more first tags of the tags, wherein the request further includes a second tag not specified in the template;
    responsive to the request, retrieving policies among the stored multiple policies that are associated with same tags as the one or more first tags specified in the identified template;
    generating configuration parameters for data path components in a host machine of the virtual computing instance and for data path components of the virtual computing instance based on the retrieved policies, wherein if a first policy of the retrieved policies that is associated with a first tag of the one or more first tags conflicts with a second policy that is associated with the second tag, the second policy is used instead of the first policy; and
    transmitting the generated configuration parameters to the host machine for the host machine to configure the security or operational parameters of the virtual computing instance therewith.

2. The method of claim 1, wherein the host machine includes a virtualization layer that supports execution of the virtual computing instance in the host machine, the virtualization layer including a logical switch to which a virtual network interface controller of the virtual computing instance is connected for communication with other computing entities.

3. The method of claim 2, wherein the request includes an identification of a logical port of the logical switch to which the virtual network interface controller is connected, and the configuration parameters are generated based on the retrieved policies and the identification of the logical switch.

4. The method of claim 1, wherein one of the tags is associated with more than one policy.

5. A virtualized computing system comprising:
    a host machine having a virtualization layer that supports execution of virtual computing instances;
    a first management server configured to manage deployment of virtual computing instances on the host machine; and
    a second management server configured to perform configuration of virtual computing instances deployed by the first management server,
    wherein the second management server:
        stores multiple policies, each defining one or more security or operational parameters for virtual computing instances, the security or operational parameters comprising one or more of:
            load balancing configuration parameters; or
            network address translation configuration parameters;
        associates tags to one or more of the multiple policies such that the tags, when applied to a virtual computing instance, identify a set of the policies to apply to the virtual computing instance;
        receives a request to configure a virtual computing instance being deployed on the host machine, the request including information identifying a template, the template specifying one or more first tags of the tags, wherein the request further includes a second tag not specified in the template;
        responsive to the request, retrieving policies among the stored multiple policies that are associated with same tags as tags specified in the identified;
        generates configuration parameters for data path components in the host machine and for data path components of the virtual computing instance based on the retrieved policies, wherein if a first policy of the retrieved policies that is associated with a first tag of the one or more first tags conflicts with a second policy that is associated with the second tag, the second policy is used instead of the first policy; and
        transmits the generated configuration parameters to the host machine for the host machine to configure the security or operational parameters of the virtual computing instance therewith.

6. The system of claim 5, wherein the virtualization layer includes a logical switch to which a virtual network interface controller of the virtual computing instance is to be connected for communication with other computing entities.

7. The system of claim 6, wherein the request includes an identification of a logical port of the logical switch to which the virtual network interface controller is connected, and the configuration parameters are generated based on the retrieved policies and the identification of the logical switch.

\* \* \* \* \*